(12) United States Patent
Phillips

(10) Patent No.: US 10,539,375 B2
(45) Date of Patent: Jan. 21, 2020

(54) DIMPLED HEAT SHIELD

(71) Applicant: Dana Automotive Systems Group, LLC, Maumee, OH (US)

(72) Inventor: Mark Samuel Phillips, Chatham (CA)

(73) Assignee: Dana Automotive Systems Group, LLC, Maumee, OH (US)

( * ) Notice: Subject to any disclaimer, the term of this patent is extended or adjusted under 35 U.S.C. 154(b) by 74 days.

(21) Appl. No.: 15/883,222

(22) Filed: Jan. 30, 2018

(65) Prior Publication Data

US 2019/0234694 A1 Aug. 1, 2019

(51) Int. Cl.
| | | |
|---|---|---|
| *B23B 3/02* | (2006.01) | |
| *F28F 3/04* | (2006.01) | |
| *B60R 13/08* | (2006.01) | |
| *F16L 59/02* | (2006.01) | |

(52) U.S. Cl.
CPC .......... *F28F 3/044* (2013.01); *B60R 13/0876* (2013.01); *F16L 59/029* (2013.01); *F28F 2270/02* (2013.01)

(58) Field of Classification Search
CPC ...... F28F 3/044; F16L 59/029; B60R 13/0876
See application file for complete search history.

(56) References Cited

U.S. PATENT DOCUMENTS

| | | | |
|---|---|---|---|
| 4,348,442 | A | 9/1982 | Irving et al. |
| 5,196,253 | A | 3/1993 | Mueller et al. |
| 5,800,905 | A | 9/1998 | Sheridan et al. |
| 5,981,082 | A | 11/1999 | Pirchl |
| 6,451,447 | B1 | 9/2002 | Ragland et al. |
| 7,972,708 | B2 | 7/2011 | Schweiggart et al. |
| 2006/0194025 | A1 | 8/2006 | Oxenknecht |
| 2012/0180753 | A1 | 7/2012 | Fonville et al. |
| 2018/0031335 | A1* | 2/2018 | Graham .............. B60R 13/0876 |

FOREIGN PATENT DOCUMENTS

| | | |
|---|---|---|
| DE | 4035177 A1 | 11/1990 |
| DE | 29924102 U1 | 1/2002 |
| DE | 19849366 A1 | 4/2004 |
| EP | 1775437 A1 | 4/2007 |
| EP | 2022957 B1 | 4/2010 |
| WO | 0046493 A1 | 8/2000 |
| WO | 2004098808 A1 | 11/2004 |
| WO | 2010112354 A1 | 10/2010 |

* cited by examiner

*Primary Examiner* — Elizabeth E Mulvaney
(74) *Attorney, Agent, or Firm* — Marshall & Melhorn, LLC

(57) ABSTRACT

A heat shield has a first layer, a second layer and a third layer. The first layer may have an outer surface and an inner surface. The second layer may have a first inner surface and a second inner surface. The third layer may have an inner surface and an outer surface, where the outer surface is defined by a plurality of dimples.

19 Claims, 2 Drawing Sheets

DIMPLED HEAT SHIELD

FIELD OF THE DEVICE

The present device relates to a dimpled heat shield that may be used to shield a heat sensitive component from a source of heat.

BACKGROUND OF THE DEVICE

Heat shields are well-known devices designed to dissipate and/or re-direct heat from a heat source away from a shielded component. In vehicles, heat shields may be used to shield electronics or other heat sensitive components from heat sources.

Vehicle heat sources, such as engines, and turbos and exhaust components, are trending toward putting out a greater quantity of heat at a higher temperature than before as manufactures try to increase engine performance. Traditional heat shields are not designed to deal with these increased temperatures and the components they protect may not work properly, or fail, if the heat shields do not work as intended. Thus, a new heat shield is required that can handle the increased temperatures and still protect their components.

SUMMARY OF THE DEVICE

In one embodiment, a heat shield has a first, second and third layers. The first layer may be metallic and have an outer surface and an inner surface opposite said outer surface. The inner and outer surfaces may define a constant thickness between them. The second layer may be nonmetallic. It may have a first inner surface and a second inner surface opposite said first inner surface. The first and second inner surfaces may define a constant thickness between them. The third layer may be metallic and have an inner surface and an outer surface. The outer surface may be defined by a plurality of dimples whose troughs only that extend toward the second layer. The troughs of the dimples are in direct contact with the first inner surface of the second layer.

In a further aspect, the first and third layers are the same material and the second layer is a different material.

In a further aspect, the first and third layers are metal.

In a further aspect, the second layer is a non-metallic material.

In a further aspect, the second layer is entirely bounded on both sides.

In a further aspect, the third layer outer surface is uninterrupted and smooth except for the dimples.

In a further aspect, first, second and third layers are each unitary, one-piece and integrally formed.

In a further aspect, a row of the air gaps has a constant length, height and depth.

In a further aspect, the first layer is located adjacent a heat source and the third layer is located opposite the heat source.

In a further aspect, the second layer is thicker than the first layer.

In a further aspect, at least one trough of the dimples has a height greater than the thickness of the first layer.

In a further aspect, the plurality of dimples comprise dimples regularly spaced from one another in an array.

In a further aspect, the second inner surface of the second nonmetallic layer is in direct, continuous contact with the inner surface of the first metallic layer.

In a further aspect, second layer is thicker than the first layer.

In a further aspect, at least one trough of the dimples has a height greater than the thickness of the first layer.

In a further aspect, air gaps separate the dimples wherein the air gaps are an insulation layer.

In a further aspect, air gaps form a web of fluid connected air gaps between the second layer and the third layer.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION OF THE PREFERRED EMBODIMENTS

It is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
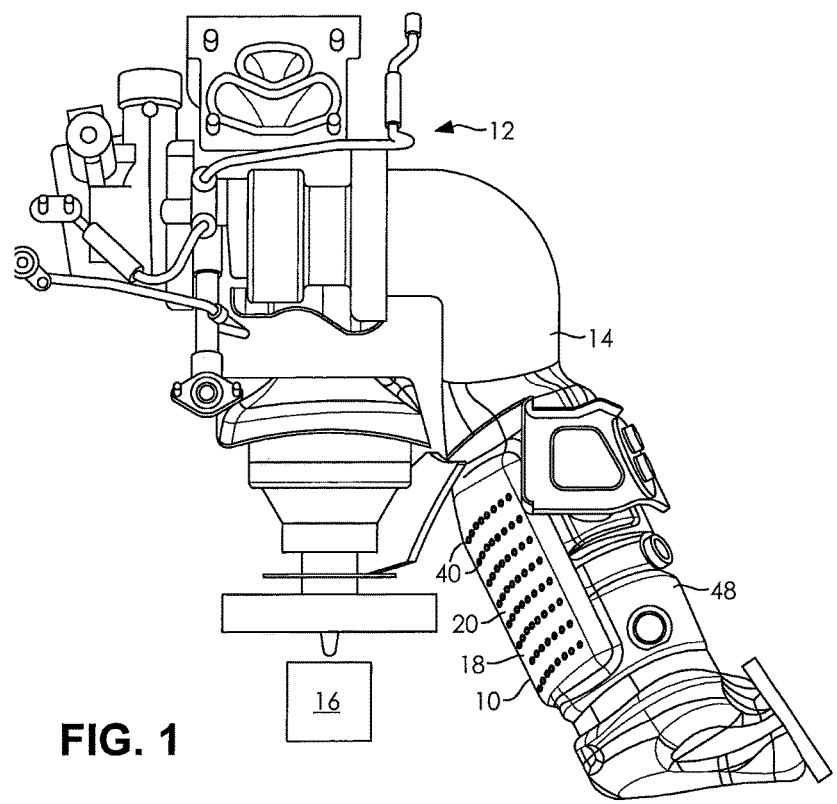
FIG. 1 is a schematic, perspective view of one embodiment of a heat shield installed on components.

Turning now to FIG. 1, one embodiment of a heat shield 10 is depicted installed on, or with, certain components. The components may be associated with an internal combustion engine, such as for a vehicle. In the depicted embodiment, a high temperature component for a turbo charger 12 is depicted. The component may be such as a pipe, or conduit 14, for hot gases from the turbo charger 12.

While the heat shield 10 is depicted as shielding a temperature sensitive component 16 from the conduit 14, the heat shield 10 may shield other components associated with the engine, the vehicle driveline, other structures of the vehicle or even structures in need of heat shielding not associated with vehicles.

Continuing with the example depicted in FIG. 1, the hot gases from the turbo charger 12 cause the conduit 14 to heat up. The tight packaging in the engine compartment results in the conduit 14 extending adjacent engine components that are heat sensitive, such as the temperature sensitive component 16. The heat shield 10 described and depicted herein is located on, or at least partially about, the conduit 14 so as to reduce, or prevent, the heat from the conduit 14 from reaching the heat sensitive engine component 16. It is also permissible for the heat shield 10 to be located anywhere between a heat source and temperature sensitive engine components 16.

Figure 4:
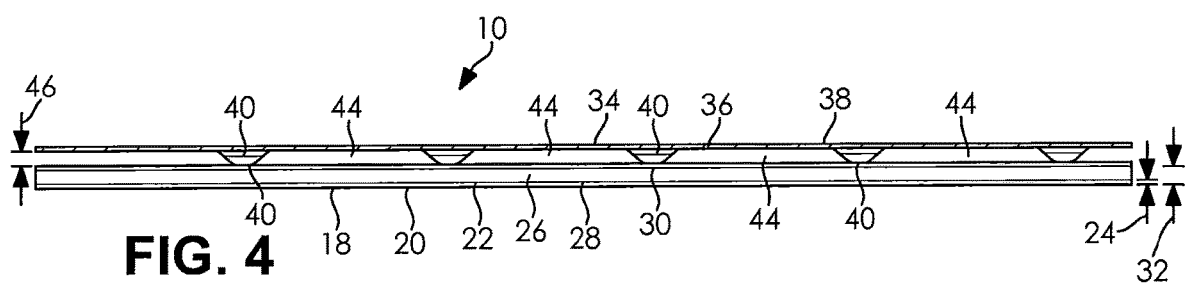
FIG. 4 is a cross-sectional side view along lines 4-4 of FIG. 2.

Turning now to FIG. 4, one embodiment of the heat shield 10 is depicted. FIG. 4 depicts a first layer 18 having an outer surface 20 and an inner surface 22 opposite the outer surface 20. The inner and outer surfaces 20, 22 define a constant thickness 24 between them. The inner and outer surfaces 20, 22 may be entirely continuous and smooth. No dimples, or other like structures, are located in the first layer 18.

The first layer 18 may be unitary, one piece and integrally formed. The first layer 18 may be constructed of metal. In one embodiment, the first layer 18 may be constructed of SS304 stainless steel. While one metal is disclosed, others may be used.

The first layer 18 may be between approximately 0.1 to 0.3 mm thick. In the depicted embodiment, the first layer 18 is approximately 0.2 mm thick. While certain thicknesses of the first layer 18 of the depicted embodiment have been disclosed, other thicknesses are permissible.

The first layer 18 is designed to be adjacent a heat source (such as conduit 14 herein). More particularly, in terms of the heat shield 10, the first layer 18 is designed to be the heat shield layer that is closest to the heat source compared to all other layers of the heat shield 10. By way of example, first layer 18 is the layer that is visible on the inside of the heat shield 10 in FIG. 3. First layer 18 would be located directly adjacent conduit 14.

FIG. 4 depicts a second layer 26 of the heat shield 10. The second layer 26 may have a first inner surface 28 and a second inner surface 30 opposite the first inner surface 28. The first and second inner surfaces 28, 30 define a constant thickness 32 between them. The first and second inner surfaces 28, 30 are entirely continuous and smooth. Preferably, the first layer inner surface 28 is in complete, continuous and direct contact with the second inner surface 30 of the second layer 26.

The second layer 26 may be unitary, one piece and integrally formed. The second layer 26 may be constructed of a non-metallic material, such as insulation. In one embodiment, the second layer 26 may be constructed of glass fiber mat, e-glass, synthetic fibers, HT-glass, and/or silica-fiber. While one material for the second layer 26 is disclosed, others may be used.

The second layer 26 may be between approximately 0.5 to 1 mm thick. While certain thicknesses of the second layer 26 of the depicted embodiment have been disclosed, other thicknesses are permissible. In the depicted embodiment, the second layer 26 may be thicker than the first layer 18.

FIG. 4 also depicts a third layer 34 having an inner surface 36 and an outer surface 38. The third layer 34 is designed to be opposite the heat source in the heat shield 10. In other words, in the depicted embodiment, the first and second layers 18, 26 and then third layer 34, in order, are located from the heat source. Thus, the second layer 26 is entirely bounded on either side by the first 18 and third 34 layers.

The inner and outer surfaces 36, 38 of the third layer 34 are defined by a plurality of dimples 40. The dimples 40 have inwardly (such as toward the second layer 26) extending troughs 42. The troughs 42 of the dimples 40 are in direct contact with the first inner surface 28 of the second layer 26. Air gaps 44 separate the dimples 40 from one another. The second layer first inner surface 28 and the third layer inner surface 36 further define the air gaps 44. At least one row of the air gaps 44 have a constant length, height and depth.

The inner and outer surfaces 34, 38 of the third layer 34 are uninterrupted and smooth except for the dimples 40. Preferably, the troughs 42 of the dimples 40 only extend toward the second layer 28; they do not extend away from the second layer 28.

In the depicted embodiment, the troughs 42 of the dimples 40 have a height 46 greater than the thickness 24 of the first layer 18. In other words, the troughs 42 extend downwardly toward the second layer 26 a greater distance than the first layer 18 is thick.

The third layer 34 may be unitary, one piece and integrally formed. The third layer 34 may be constructed of metal. In one embodiment, the third layer 34 may be constructed of SS304 stainless steel. While one metal is disclosed, others may be used.

The third layer 34 may be between approximately 0.1 to 0.3 mm thick. In the depicted embodiment, the third layer 34 is approximately 0.2 mm thick. While certain thicknesses of the third layer 34 of the depicted embodiment have been disclosed, other thicknesses are permissible.

The depicted embodiment preferably comprises only three layers there being no intervening layers between the first, second and third layers 18, 26, 34 and there being no additional layers on either side of the first or third layers 18, 34.

Figure 2:
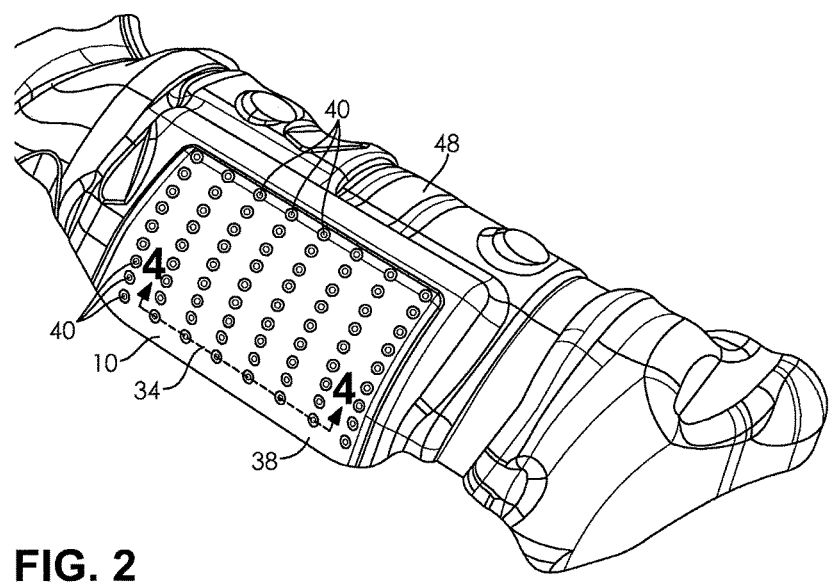
FIG. 2 is a schematic, perspective view of an outside surface of the heat shield of FIG. 1.
Figure 3:
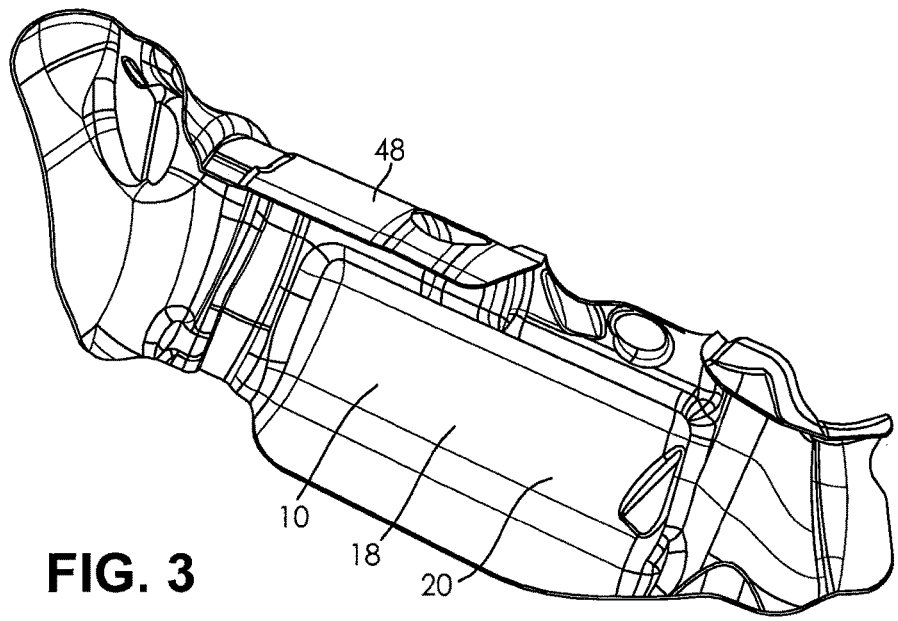
FIG. 3 is a schematic, perspective view of an inside surface of the heat shield of FIGS. 1 and 2.

FIGS. 1, 2 and 3 depict one embodiment of the heat shield 10 installed on, or integrally formed, with a shroud 48. The shroud 48, as noted above, is attached to and/or at least partially surrounds a source of heat. The shroud 48 may be different shapes and sizes from that depicted and described herein. The shroud 48 may be constructed of a heat dissipating or heat reducing material.

In the depicted embodiment, the heat shield 10 is integrally formed, one piece and unitary with the shroud 48. The heat shield 10 may, however, function entirely on its own with the shroud 48, as can be appreciated from FIG. 4.

In the embodiment where the heat shield 10 is formed with the shroud 48. The heat shield 10 may be located in an area where the shroud 48 by itself is insufficient to dissipate or deflect heat away from a temperature sensitive component 16. The insufficiency of the shroud 48 may be because it may be constructed of only a single layer of metal. In this case, the heat shield 10 may be integrated with the shroud 48 to provide the system with sufficient heat deflecting/dissipating functionality.

Based on the foregoing, it can be appreciated that the heat shield 10 as integrated into the shroud 48 can be any shape or size as needed to control the heat.

FIGS. 1 and 2 depict the dimples 40 in one embodiment of a pattern or array. In the depicted array, the dimples 40 are arranged in a plurality of rows and a plurality of columns. The dimples 40 in each row and column are equally spaced from one another. This may result in air gaps 44 with a constant length, height and depth. In this case, the dimples 40 happen to be arranged in a rectangular array. Preferably, all of the troughs 42 of the dimples 40 extend in the same direction.

As noted above, and as can be appreciated from the figures, only the third layer 34 has the dimples 40. A non-dimpled outer surface 20 of the first layer 18, which is continuous and smooth, can be readily appreciated from both FIGS. 3 and 4.

The dimples 40 create at least one of the above-mentioned air gaps 44, and preferably, a plurality of air gaps 44 that separate the second and third layers 26, 34. The plurality of air gaps 44 form a web-like fluid connection of air gaps 44 through the heat shield 10. The web connection of the air gaps 44 helps for heat to dissipate through the air gaps 44, which directs the heat across the heat shield 10 where it can be dissipated. The air gaps 44 function acts as an insulator to further prevent, or reduce, heat from transferring from the first layer 18 to the third layer 34.

In accordance with the provisions of the patent statutes, the present device has been described in what is considered to represent its preferred embodiments. However, it should be noted that the device can be practiced otherwise than as specifically illustrated and described without departing from its spirit or scope.

What is claimed is:

1. A heat shield, comprising:
   a first layer having an outer surface and an inner surface opposite said outer surface, said inner and outer surfaces defining a constant thickness between them, wherein said inner and outer surfaces are entirely continuous and smooth;
   a second layer having a first inner surface and a second inner surface opposite said first inner surface, said first and second inner surfaces defining a constant thickness between them, wherein said first and second inner surfaces are entirely continuous and smooth, wherein said first layer inner surface is in complete, continuous and direct contact with said second layer second inner surface; and
   a third layer having an inner surface and an outer surface, wherein said outer surface is defined by a plurality of dimples, wherein troughs of the dimples are in direct contact with said first inner surface of said second layer, wherein air gaps separate said dimples from one another, wherein said inner and outer surfaces of said third layer define a constant thickness for said plurality of dimples and said third layer.

2. The heat shield of claim 1, wherein the first and third layers are the same material and the second layer is a different material.

3. The heat shield of claim 2, wherein said first and third layers are metal.

4. The heat shield of claim 2, wherein said second layer is a non-metallic material.

5. The heat shield of claim 1, wherein said second layer is entirely bounded on both sides.

6. The heat shield of claim 1, wherein said third layer outer surface is uninterrupted and smooth except for said dimples.

7. The heat shield of claim 1, wherein said first, second and third layers are each unitary, one-piece and integrally formed.

8. The heat shield of claim 1, wherein a row of said air gaps have a constant length, height and depth.

9. The heat shield of claim 1, wherein said first layer is located adjacent a heat source and said third layer is located opposite said heat source.

10. The heat shield of claim 1, wherein said second layer is thicker than said first layer.

11. The heat shield of claim 1, wherein at least one trough of said dimples has a height greater than the thickness of said first layer.

12. The heat shield of claim 1, wherein said plurality of dimples comprise dimples regularly spaced from one another in an array.

13. A heat shield, comprising:
   a first metallic layer having an outer surface and an inner surface opposite said outer surface, said inner and outer surfaces defining a constant thickness between them;
   a second nonmetallic layer having a first inner surface and a second inner surface opposite said first inner surface, said first and second inner surfaces defining a constant thickness between them; and
   a third metallic layer having an inner surface and an outer surface, wherein said outer surface is defined by a plurality of dimples having only troughs that extend toward said second layer, wherein said troughs of the dimples are in direct contact with said first inner surface of said second layer, wherein said inner and outer surfaces of said third metallic layer define a constant thickness for said plurality of dimples and said third metallic layer.

14. The heat shield of claim 13, wherein the first and third layers are the same material and the second layer is a different material.

15. The heat shield of claim 13, wherein said second inner surface of said second nonmetallic layer is in direct, continuous contact with said inner surface of said first metallic layer.

16. The heat shield of claim 13, wherein said second layer is thicker than said first layer.

17. The heat shield of claim 13, wherein at least one trough of said dimples has a height greater than the thickness of said first layer.

18. The heat shield of claim 13, wherein air gaps separate said dimples wherein said air gaps are an insulation layer.

19. The heat shield of claim 18, wherein said air gaps form a web of fluid connected air gaps between said second layer and said third layer.

* * * * *